United States Patent
Christenbury et al.

(10) Patent No.: US 7,104,302 B2
(45) Date of Patent: Sep. 12, 2006

(54) RUN-FLAT SUPPORT RING WITH INTERNAL FIN

(75) Inventors: Damon L. Christenbury, Fountain Inn, SC (US); Steven A. Smith, Piedmont, SC (US)

(73) Assignee: Michelin Recherche et Technique S.A., (CH)

( * ) Notice: Subject to any disclaimer, the term of this patent is extended or adjusted under 35 U.S.C. 154(b) by 121 days.

(21) Appl. No.: 10/863,792

(22) Filed: Jun. 8, 2004

(65) Prior Publication Data

US 2005/0269007 A1 Dec. 8, 2005

(51) Int. Cl.
*B60C 17/00* (2006.01)
*B60C 17/04* (2006.01)

(52) U.S. Cl. .............. 152/516; 152/152; 152/520; 428/98; 428/156

(58) Field of Classification Search .......... 152/152, 152/516, 520
See application file for complete search history.

(56) References Cited

U.S. PATENT DOCUMENTS

| | | | |
|---|---|---|---|
| 2,742,941 A | 4/1956 | Johnson | |
| 4,177,848 A * | 12/1979 | Van der Burg | 152/158 |
| 5,139,066 A | 8/1992 | Jarman | |
| 5,634,993 A | 6/1997 | Drieux et al. | |
| 5,891,279 A | 4/1999 | Lacour | |
| 6,415,839 B1 | 7/2002 | Pompier et al. | |
| 6,598,633 B1 | 7/2003 | Pompier et al. | |
| 6,955,202 B1 * | 10/2005 | Chen | 152/520 |
| 2002/0124923 A1 | 9/2002 | Abinal et al. | |
| 2002/0124924 A1 | 9/2002 | Abinal et al. | |
| 2003/0005991 A1 | 1/2003 | Drap | |
| 2003/0209301 A1 | 11/2003 | Pompier et al. | |

FOREIGN PATENT DOCUMENTS

| | | |
|---|---|---|
| EP | 1486356 A1 | 12/2004 |
| EP | 1356958 A | 1/2005 |
| EP | 1522427 A2 | 4/2005 |
| EP | 1559589 A | 8/2005 |
| WO | WO 01008905 A | 2/2001 |
| WO | WO 0132450 A1 | 5/2001 |
| WO | WO 05068227 A | 7/2005 |

* cited by examiner

*Primary Examiner*—Justin Fischer
(74) *Attorney, Agent, or Firm*—Dority & Manning, P.A.

(57) ABSTRACT

A run-flat support ring, which is a component mounted upon a rim inside a tire to extend the distance the tire may travel at reduced or zero inflation pressure, is provided having an internal fin design that improves the rolling resistance of the support ring without sacrificing the overall load bearing and handling characteristics. Certain embodiments may also include one or more features that improve the process of mounting the support ring onto a rim and better tolerate variations, within manufacturing tolerances, in the respective diameters of the rim and the support ring.

21 Claims, 7 Drawing Sheets

RUN-FLAT SUPPORT RING WITH INTERNAL FIN

TECHNICAL FIELD OF THE INVENTION

Generally speaking, a run-flat support ring is a component mounted upon a rim inside a tire to extend the distance the tire may travel at reduced or zero inflation pressure. The present invention relates to an improved design for a run-flat support ring having an internal fin that lowers the overall mass of the support ring while still providing proper handling characteristics during run-flat conditions. In certain embodiments, the run-flat support ring of the present invention may also be provided with features that improve the process of mounting the support ring onto a rim and features that better tolerate variations, within manufacturing tolerances, in the relative diameters of the rim and the support ring.

BACKGROUND OF THE INVENTION

Solutions have been proposed for assemblies that allow extended operation of a vehicle after a partial or total loss of air pressure. Many of these systems include multiple components that are complicated and time consuming to use or assemble. U.S. Pat. No. 5,891,279, which is incorporated herein in its entirety by reference, overcomes some of these difficulties. Such patent describes an assembly that includes a tire, a rim with a unique profile designed to accept the tire, and a deformable, but preferably circumferentially inextensible, run-flat support ring that is mounted over an essentially cylindrical bearing surface of the rim. The base of the support ring includes essentially inextensible, circumferentially oriented reinforcement elements to create an interference fit between the support and bearing surface of the rim. U.S. patent application Publication US2003/0005991, which is also incorporated herein in its entirety by reference, also describes a rim and run-flat support ring that includes a plurality of zones having protuberances on the bearing surface of the support but without a complementary depression in the rim.

The design of a run-flat support ring includes competing considerations of performance under run-flat conditions and assembly of the run-flat system. For performance, a tire assembly having a low rolling resistance is generally preferred because such may contribute to the overall fuel efficiency of the vehicle. While removing weight from the tire assembly can help lower its rolling resistance, weight cannot be arbitrarily removed from a support ring because its structural features bear the load of the vehicle during run-flat operation. Thus, a run-flat support ring that enhances the handling of the vehicle during run-flat operation while minimizing the necessary increase in rolling resistance brought about by the addition of a support ring to the tire assembly is preferred.

For mounting the support ring onto a rim, a certain amount of axial locating force is required when a run-flat support is mounted upon the rim. Preferably, this force is sufficiently low to allow proper seating of the support during mounting or dismounting. However, for run-flat operation, the force for unseating the ring from the rim must be sufficiently high so that the support maintains its proper position during reasonable vehicle operation. Furthermore, even when manufactured within reasonable and acceptable tolerances, a run-flat support having a diameter that is within the low end of its manufacturing tolerance may be particularly difficult to mount and dismount with a rim having a diameter that is within the high end of its manufacturing tolerance. A run-flat support that more readily tolerates variances of the support and rim within the allowed manufacturing tolerances is also preferred.

Therefore, a run-flat support that meets the handling and mounting requirements discussed above while also improving the rolling resistance of the tire assembly is desirable.

SUMMARY OF THE INVENTION

Objects and advantages of the invention will be set forth in part in the following description, or may be obvious from the description, or may be learned through practice of the invention.

The present invention provides a run-flat support ring having features that improve the mounting and dismounting requirements for the support ring while still providing a fit that maintains the lateral and circumferential position of the support ring during proper operation of the vehicle under conditions of partial or total loss of inflation pressure. In addition, the present invention also provides a run-flat support ring that uses an internal fin design to decrease weight and thereby improve the rolling resistance of the tire assembly into which the ring is incorporated.

In one exemplary embodiment, the present invention provides a run-flat support ring for mounting inside a tire on a wheel rim, where the tire has a tread strip region, the wheel rim defines an inboard and an outboard side, and defines at least one annular depression and one annular raised surface. This embodiment of a run-flat support ring includes a substantially cylindrical member configured for mounting around the wheel rim. The substantially cylindrical member has a radially outer-most surface for contacting the tread strip region of the tire in the event of a loss of air pressure. The substantially cylindrical member also has a radially inner-most surface for securing the member to the wheel rim. The radially inner-most surface includes i) a plurality of circumferentially placed protuberances configured to engage the depression; ii) a plurality of circumferentially placed tabs configured for engaging the wheel rim proximate to the depression; and iii) a plurality of circumferentially placed ribs, extending longitudinally along the axial direction, and configured for engaging the annular raised surface.

For this embodiment, a plurality of wall members (also referred to as fins) are positioned circumferentially about the cylindrical member. Each wall member extends in a radial direction between the radially outer-most surface and the radially inner-most surface. Each wall member is constructed as a single wall on the outboard side that diverges along an axial direction of the wheel rim into two walls on the inboard side.

In another exemplary embodiment of the present invention, a run-flat support ring is provided for mounting on a wheel rim inside a tire in order to support the tread strip region of the tire in the event of a loss of inflation pressure. The wheel rim defines an axis of rotation, an annular recess, and a seat for the support ring. The seat defines an outboard bearing surface and an inboard bearing surface; the inboard bearing surface is located at a greater radial distance from the axis of rotation than the outboard bearing surface. The run-flat support ring includes a substantially cylindrical base designed for placement around the wheel rim. The base defines a clip that is circumferentially oriented and configured for positioning into the annular recess. The clip has at least one discontinuity along the clip's circumference. A substantially cylindrical cap is configured for contact with the tread strip region in the event of a sufficient loss of air pressure. A support body is connected to the base and the cap and has an inboard side and an outboard side. The support body includes a plurality of single-wall structures located along the outboard side of the support body and is oriented longitudinally in a manner that is parallel to the axis of rotation.

In still another exemplary embodiment of the present invention, a run-flat support ring for mounting on a wheel rim within a tire is provided in which the support ring has an inboard side and an outboard side. The wheel rim has a groove located circumferentially about a radially outer-most surface. The wheel rim also defines an axial direction. The run-flat support ring includes a substantially inextensible, circular body, configured for mounting upon the radially outer-most surface of the wheel rim. This substantially inextensible circular body also has a radially inner-most surface that defines multiple raised segments that are configured for placement within the groove of the wheel rim. Each raised segment each has a longitudinal axis that is oriented circumferentially along the radially inner-most surface and is separated from adjacent raised segments by a predetermined distance. The substantially inextensible, circular body has a radially outer-most surface that is configured for contact with the tire. The body also has a plurality of radially projecting fins located along the outboard side between the radially outer-most surface and the radially inner-most surface, the fins being oriented longitudinally along the axial direction. The support ring may also include multiple, rotation-resisting surfaces defined by the radially inner-most surface and individually located between at least two of the raised segments. The ring may also be equipped with multiple ribs positioned upon the radially inner-most surface, each of the ribs extending from one of the multiple, rotation-resisting surfaces, and each of the ribs being longitudinally oriented along the axial direction. In certain embodiments, the radially projecting fins located along the outboard side diverge into two separate walls along the inboard side. The support ring may also be constructed such that each of the raised segments is located radially adjacent to one of the radially projecting fins. Additionally, the predetermined distance between the raised segments may be varied, but in certain embodiments at least about 10 mm is preferred.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in this specification, which makes reference to the appended figures, in which:

FIG. 2 presents the radially-inner surface of this embodiment as viewed from the outboard side.

FIG. 5 presents the radially-inner surface of this embodiment as viewed from the outboard side.

Figure 1:
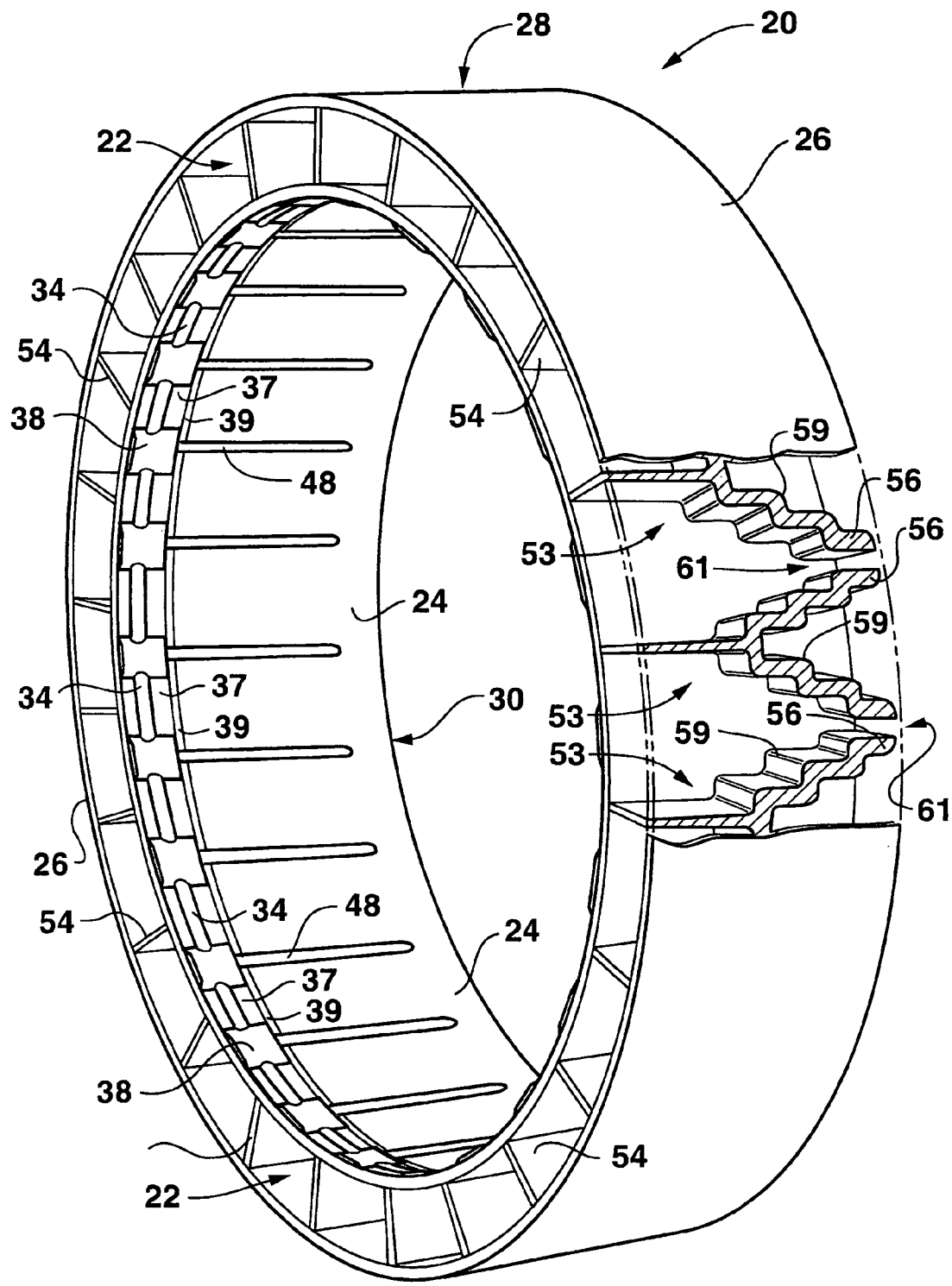
FIG. 1 is a perspective view of an exemplary embodiment of the present invention viewed from the outboard side.

Repeat use of reference characters in the present specification and drawings is intended to represent same or analogous features or elements of the invention.

DETAILED DESCRIPTION OF THE PREFERRED EMBODIMENTS

The present invention provides a support ring having an internal fin that reduces the overall weight contribution of the support ring to a tire assembly without unacceptably compromising vehicle handling during run-flat operation. In certain embodiments of the present invention, features may also be included that provide improved mounting and dismounting characteristics. Reference will now be made in detail to embodiments of the present invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

Figure 2:
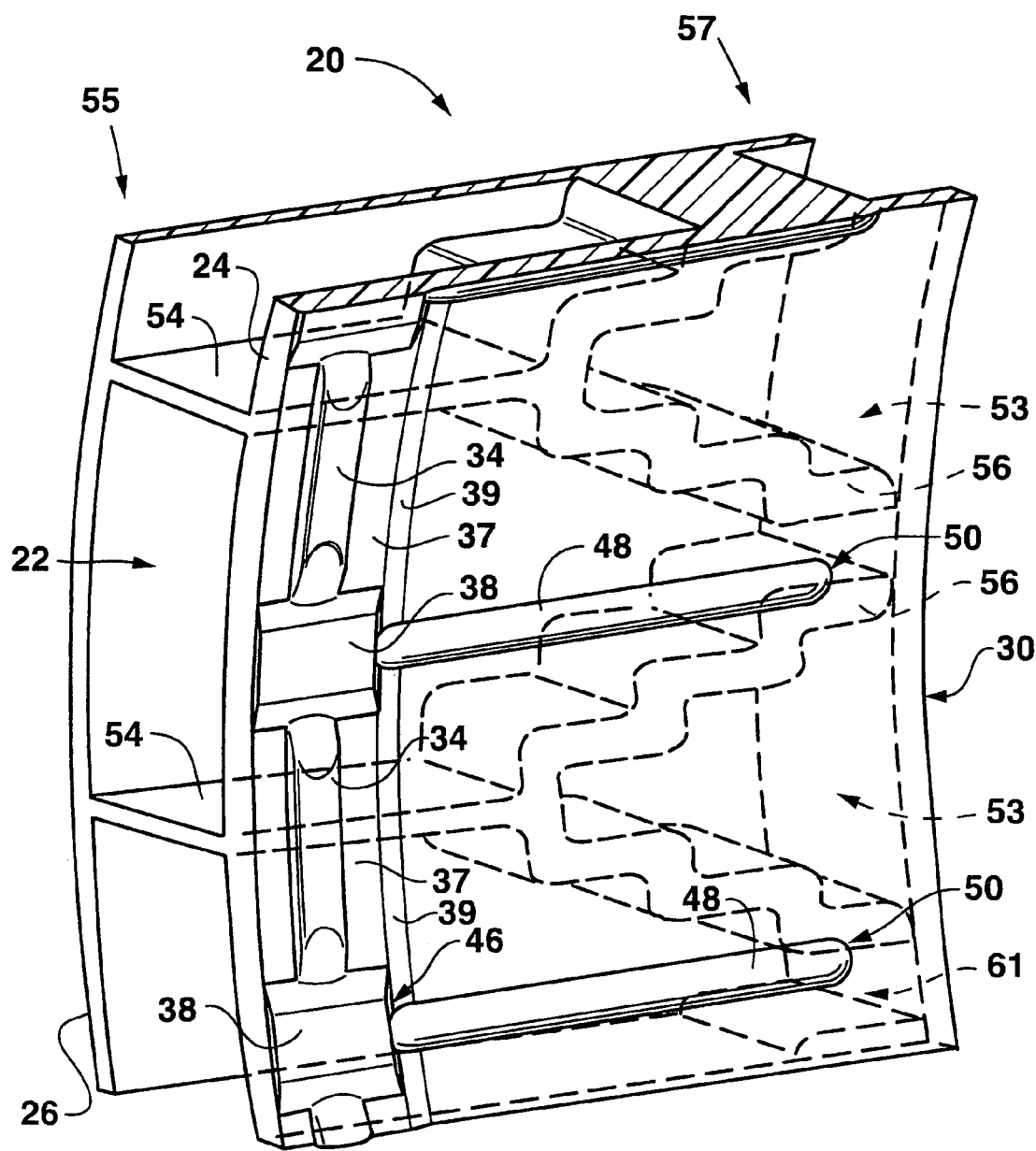
FIG. 2 is a perspective and close-up view of a section of the exemplary embodiment illustrated in FIG. 1.
Figure 3:
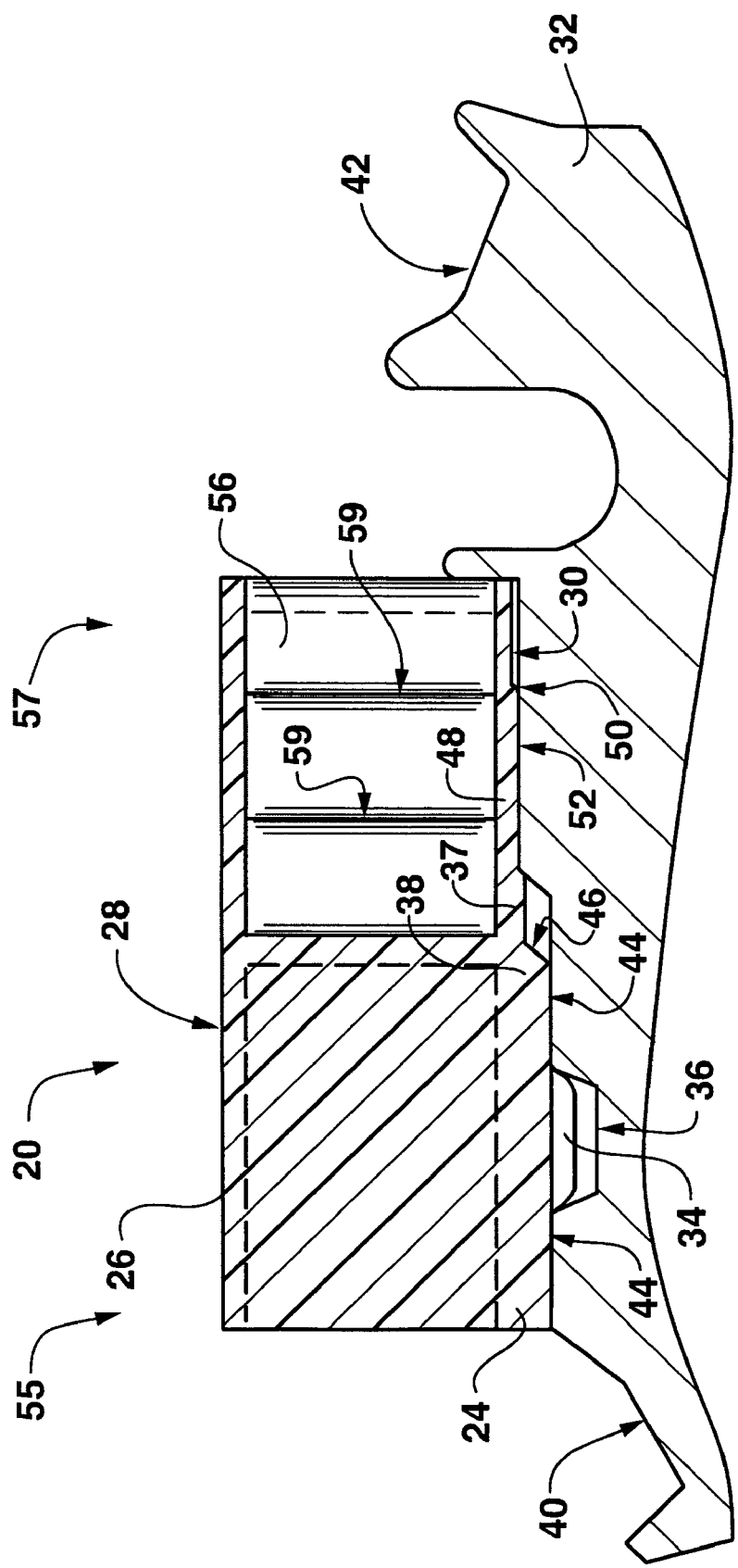
FIG. 3 is a cross-sectional view of the exemplary embodiment of FIG. 1 as mounted upon a representative rim.

An exemplary embodiment of the present invention is depicted in FIGS. 1 through 3. A run-flat support ring 20, also referred to as a support ring, is provided with a substantially cylindrical body 22 that connects a substantially cylindrical base 24 to a substantially cylindrical cap 26. Support ring 20 is placed over a rim 32 (FIG. 3) as part of a run-flat tire system. During zero or low-pressure operation of a tire assembly incorporating a properly mounted support ring 20, radially outer-most surface 28 of support ring 20 contacts the inner surface of the tire, referred to herein as the tread strip region, to provide improved handling characteristics during reasonable vehicle operation.

As also shown in FIG. 1 and FIG. 2, cylindrical body 22 defines a plurality of wall members 53, each having an overall Y-shape for the exemplary embodiment depicted. More specifically, each wall member 53 includes a single wall or fin 54 that diverges into a pair of walls 56. Each fin 54 is located primarily along the outboard side 55 (FIG. 2) of support ring 20 while each pair of walls 56 is located along the inboard side 57 of support ring 20. Wall members 53 extend in the radial direction between radially inner-most surface 30 and radially outer-most surface 28. Fin 54 is oriented longitudinally in a manner that is parallel to the axis about which support ring 20 would rotate during operation. Although not required, preferably each fin 54 is located radially adjacent to at least one protuberance 34.

Applicants have discovered that the use of fins 54 on the outboard side of support ring 20 offers advantages in some vehicle applications. As opposed to a construction where the pair of walls 56 spans the entire axial width of support ring 20, the use of fins 54 allows an overall reduction in weight of support ring 20. As illustrated in FIG. 1 and FIG. 2, weight reduction can be realized because the thickness used for the pair of load bearing walls 56 is substantially larger than the thickness of fin 54. By not spanning the entire width of support ring 20, less overall material is used for pair of walls 56 and the overall weight of support ring 20 is thereby reduced. However, Applicants discovered that despite the reduced width, walls 56 can still bear the loading of support ring 20 during run-flat operation while fin 54 will prevent unacceptable distortion from centrifugal forces during normal operation. A series of ridges 59 on each of the pair of walls 56 further improves the load bearing capability of walls 56.

Figure 7:
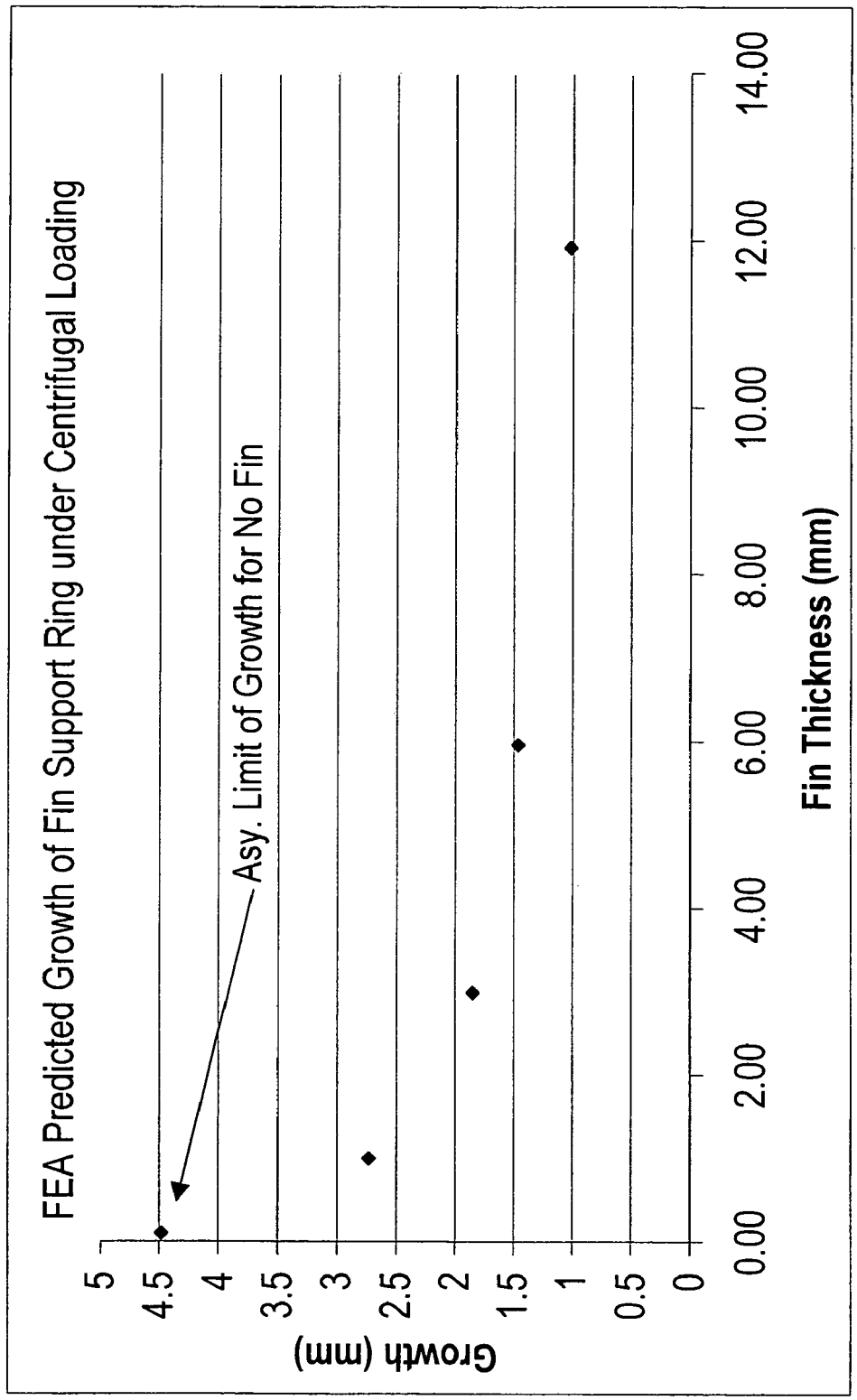
FIG. 7 is another plot of certain data as described more fully below.

While various thicknesses of fin 54 may be used depending upon the application, a thickness of about 5 mm is preferred. As shown in FIG. 7, finite element analysis can be used to predict the growth of a support ring for various fin thicknesses under a given centrifugal loading. Growth of the support ring increases as the thickness of the fin decreases, which is generally the result of reducing the amount of material available in the fin to maintain the shape of the support ring. At approximately 5 to 6 mm, the growth begins to increase exponentially as fin thickness decreases. Again, the thickness of fin 54 is determined with regard to preventing distortion by centrifugal forces and not loading during run flat operation—such loading being carried primarily by walls 56.

Using the teachings disclosed herein, one of ordinary skill in the art will understand that various modifications may be made to support ring 20 that come within the spirit and scope of the present invention. By way of example only, for the embodiments of FIGS. 1 through 3, each fin 54 and each pair of walls 56 create a wall member 53 having an overall Y-shaped appearance when viewed in the radial direction. However, various other shapes may be realized by varying the relative lengths or widths of each fin 54 and walls 56. The overall shape of body 22 can be also varied. Further, each pair of walls 56 may be separated by a gap 61 or may be connected along adjacent sides. The overall length (as measured in the axial direction) of fin 54 relative to pair of walls 56 may also be varied depending the expected loading during vehicle operation. Again, other examples of variations within the scope of the present invention exist.

Radially inner-most surface 30 of support ring 20 is supported upon rim 32 of the run-flat tire system. As shown in FIG. 3, when properly positioned upon rim 32, support ring 20 rests upon a support ring seat that includes outboard bearing surface 44 and inboard bearing surface 52. One of ordinary skill in the art will understand the process by which a support ring 20 is placed within a tire and mounted upon a rim 32 by rotating the assembly and applying certain lateral forces until properly seating the run-flat assembly.

The support ring of the present invention may also be provided with various features that improve its mounting and dismounting characteristics while also serving to prevent displacement of the ring from the rim by lateral forces that may be incurred during run-flat operation. These features are illustrated with the exemplary embodiments depicted in the figures and will now be further described. However, it should be understood that the present invention as set forth in the claims that follow in not limited to only the embodiments shown in the figures and, instead, includes embodiments that may not contain features for improving the mounting and dismounting characteristics of the support ring as now described.

Referring again to FIGS. 1 through 3, a plurality of protuberances 34, also referred to as clips, are defined by surface 30 of support ring 20 and positioned along the circumferential direction of run-flat support ring 20. Each protuberance 34 is positioned within an annular recess 36 defined by rim 32. For the exemplary embodiment of FIGS. 1 through 3, each protuberance 34 may have a height of about 1.7 mm or less relative to radially inner-most surface 30. As support ring 20 is substantially inextensible, protuberances 34 resist dismounting or movement of support ring 20 in the axial direction during reasonable vehicle operation.

Figure 6:
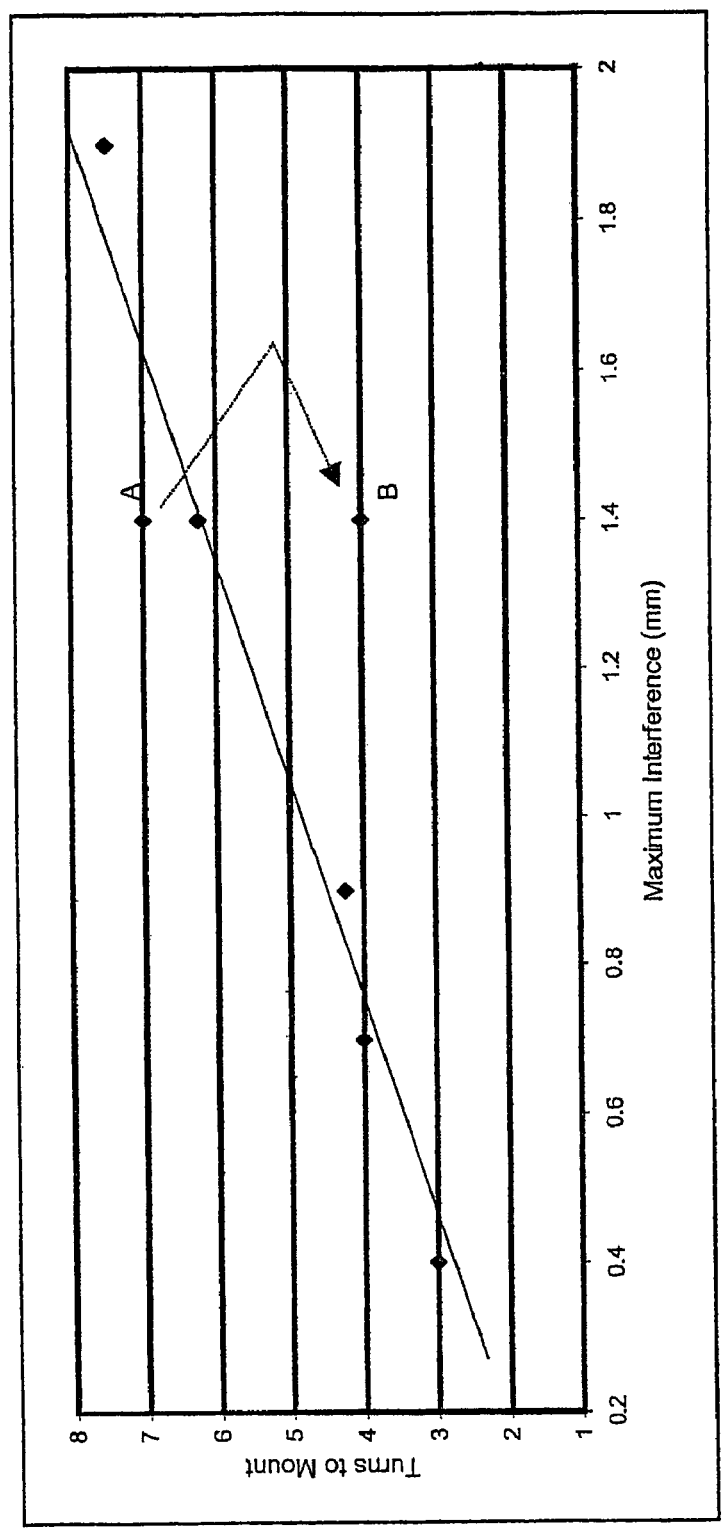
FIG. 6 is a plot of certain data as described more fully below.

Rather than a plurality of spaced or segmented protuberances 34 as shown in FIGS. 1 and 2, previous support rings have included a continuous clip or protuberance oriented circumferentially along the radially inner-most surface 30 and typically configured for positioning within a recess on the rim. One aspect of this embodiment of the present invention as described herein is the discovery that segmenting this continuous clip into a plurality of spaced protuberances 34, as shown for example in FIGS. 1 and 2, provides improved mounting and dismounting characteristics for support ring 20. FIG. 6 illustrates the effect of segmentation of the continuous clip into a plurality of clips or protuberances. One of ordinary skill in the art will understand the process by which a support ring is mounted upon a rim by rotating the rim while a lateral force is applied to seat the ring onto the rim. In FIG. 6, the x-axis represents the amount of interference between the protuberances or clips on a support ring and the mounted rim. The y-axis represents the number of times the rim had to be turned during the mounting process in order to properly seat the support ring onto the rim.

One design objective for a support ring is to minimize the number of turns required to mount the support ring onto the rim. As represented by a line drawn through the data in FIG. 6, as the amount of interference increases the number of turns required to mount the support ring also increases. It has been determined that for a given interference, the number of turns required to mount the support ring decreased significantly by segmenting the continuous clip into a plurality of protuberances or clips. For example, for an interference of 1.4 mm, removing 100 mm from an otherwise continuous clip to create a plurality of protuberances or clips about the circumference of the support ring had the effect of decreasing the number of turns required to mount the support ring from 7 turns (Point A) to 4 turns (Point B) as depicted in FIG. The result represents a substantial improvement in the time and labor required for mounting the support ring. Additional testing also revealed that separating the continuous clip into a plurality of protuberances or clips could be accomplished without unacceptably compromising the ability of the support ring to resist dismounting from the rim when operating forces are applied—such as when the vehicles turns or impacts a curb during reasonable operation at low or zero inflation pressures. It should be understood that an improvement in mounting characteristics can be achieved by removing only a single section of about 10 mm in length from a clip that is otherwise continuous circumferentially about the inner surface of the support ring, and such is within the scope of the present invention. This single discontinuity provides for a thread-like effect as the support ring is turned relative to the rim during the mounting process. Preferably, however, multiple discontinuities (which creates a plurality of clips) are uniformly spaced about the inner surface of the support ring to further enhance this thread-like effect.

Returning to the discussion of the exemplary embodiment of FIGS. 1 through 3, a plurality of rotation resisting surfaces or tabs 38 are spaced about run-flat support ring 20. For this exemplary embodiment, each individual tab 38 is at least partially located between two protuberances 34. By way of example only, each tab 38 may have a height of about 1.5 mm or less relative to radially inner-most surface 30.

During mounting, support ring 20 is moved onto rim 32 in the inboard direction, which in FIG. 3 is a direction from outboard rim seat 40 towards inboard rim seat 42. As this movement takes place, rim 32 contacts an annular band 37 defined by radially-inner-most surface 30. Contact with band 37 occurs first along the sloped, inboard edge 39 of surface 30. As shown in FIG. 2, the slope of edge 39 is preferably at an angle of about 30° degrees and facilitates positioning of the support ring 20. Using the teachings disclosed herein, one of ordinary skill in the art will appreciate that other slope angles may be used. As lateral movement of the support ring 20 continues in the inboard direction, tab 38 makes contact with rim 32 along outboard bearing surface 44. The inboard edge 46 of each tab 38 is also sloped to provide a slight ramp. This feature also further facilitates the placement of support ring 20 onto rim 32 during the mounting process and provides a means of compensating for variations within manufacturing tolerances for support ring 20 and rim 32. As shown in FIG. 3, once support ring 20 is in the proper position, tabs 38 contact rim 32 along portions of outboard bearing surface 44 that are adjacent to annular recess 36. The interference between tab 38 and rim 32 helps secure the position of support ring 20 and provides resistance against the undesirable rotation of support ring 20 relative to rim 32 during reasonable vehicle operation.

Referring to FIG. 1 and FIG. 2, also positioned upon radially inner-most surface 30 are a plurality of ribs 48 that are each located axially adjacent to, and to the inboard side of, tabs 38. Each rib 48 is longitudinally oriented along the axial direction. For the exemplary embodiment being discussed, each rib 48 has a height of about 1.2 mm or less relative to radially inner-most surface 30 and also has a height slightly less than protuberance 34. As support ring 20 is moved onto rim 32 during the mounting process, inboard edge 50 of rib 48 makes contact with inboard bearing surface 52. To enhance the ease by which that support ring 20 is mounted onto rim 32, the inboard edge 50 of each rib 48 is curvilinear in shape as shown in FIG. 2. This feature, like inboard edge 46, also helps to ensure the support ring 20 can be more readily mounted despite variations in the size of the support ring 20 and rim 32 within manufacturing tolerances. Once support ring 20 is in position as shown in FIG. 3, ribs 48 contribute to the interference fit between support ring 20 and rim 32 and thereby help secure the assembly. More specifically, inboard bearing surface 52 is at a greater radial distance from the axis of rotation of rim 32 than outboard bearing surface 44, and ribs 48 provide an interference fit through contact with inboard bearing surface 52.

Run-flat support ring 20 can be constructed from a variety of different materials. In general, a material having a tensile modulus at 10 percent strain of 10 to 100 MPa should be used. By way of example, but not limitation, suitable materials include polyurethane, thermoplastic elastomers, and rubber. Additionally, while body 22, base 24, and cap 26 may be individually constructed and combined to create support ring 20, preferably these parts are molded as a single component to create support ring 20. It should also be noted that while the present description has been provided using the particular configuration for a rim 32 as shown in FIGS. 1 through 3, the present invention is not limited to any particular rim configuration as will be understood by one of skill in the art using the teachings disclosed herein.

Figure 4:
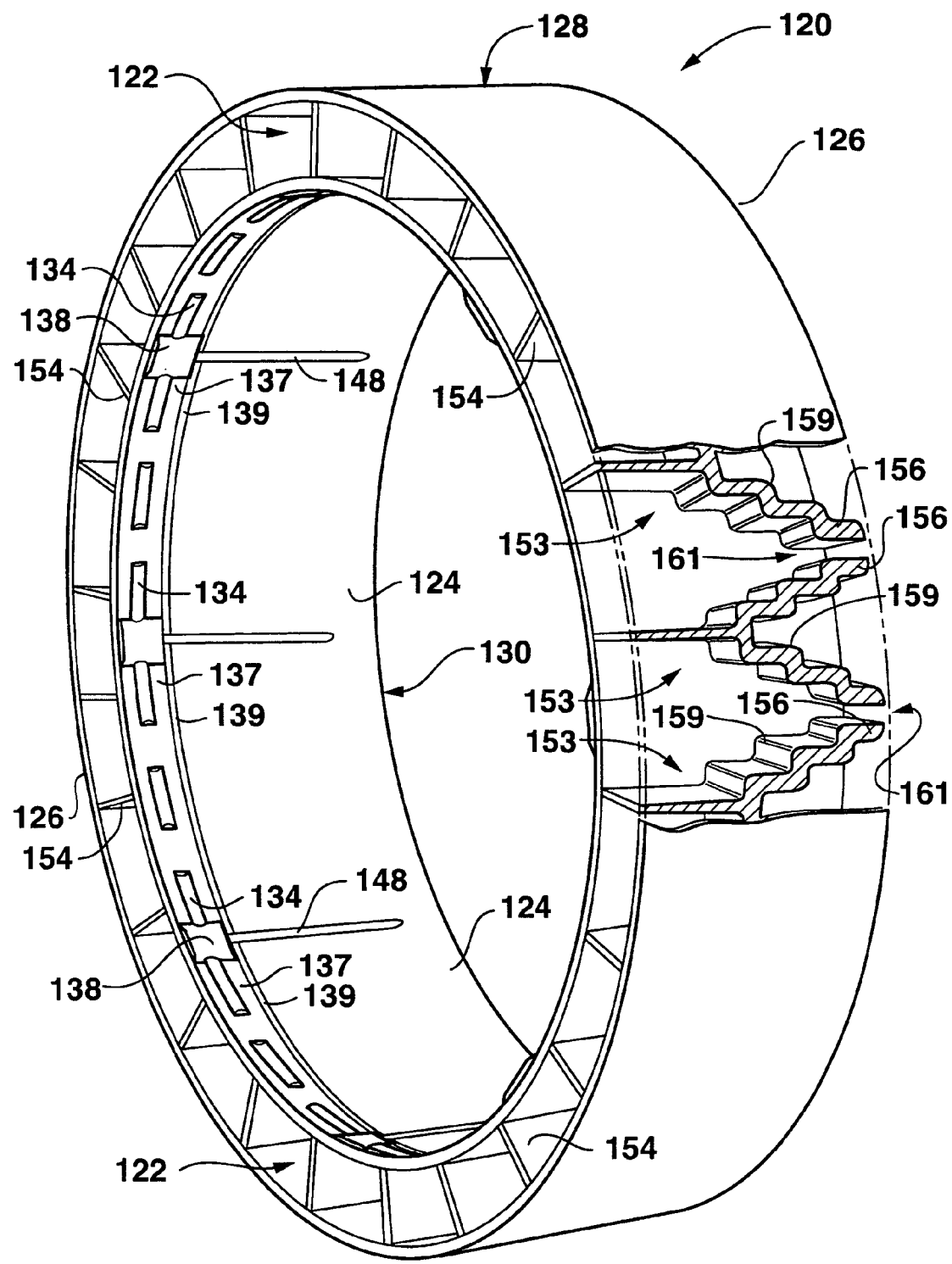
FIG. 4 is a perspective view of another exemplary embodiment of the present invention viewed from the outboard side.
Figure 5:
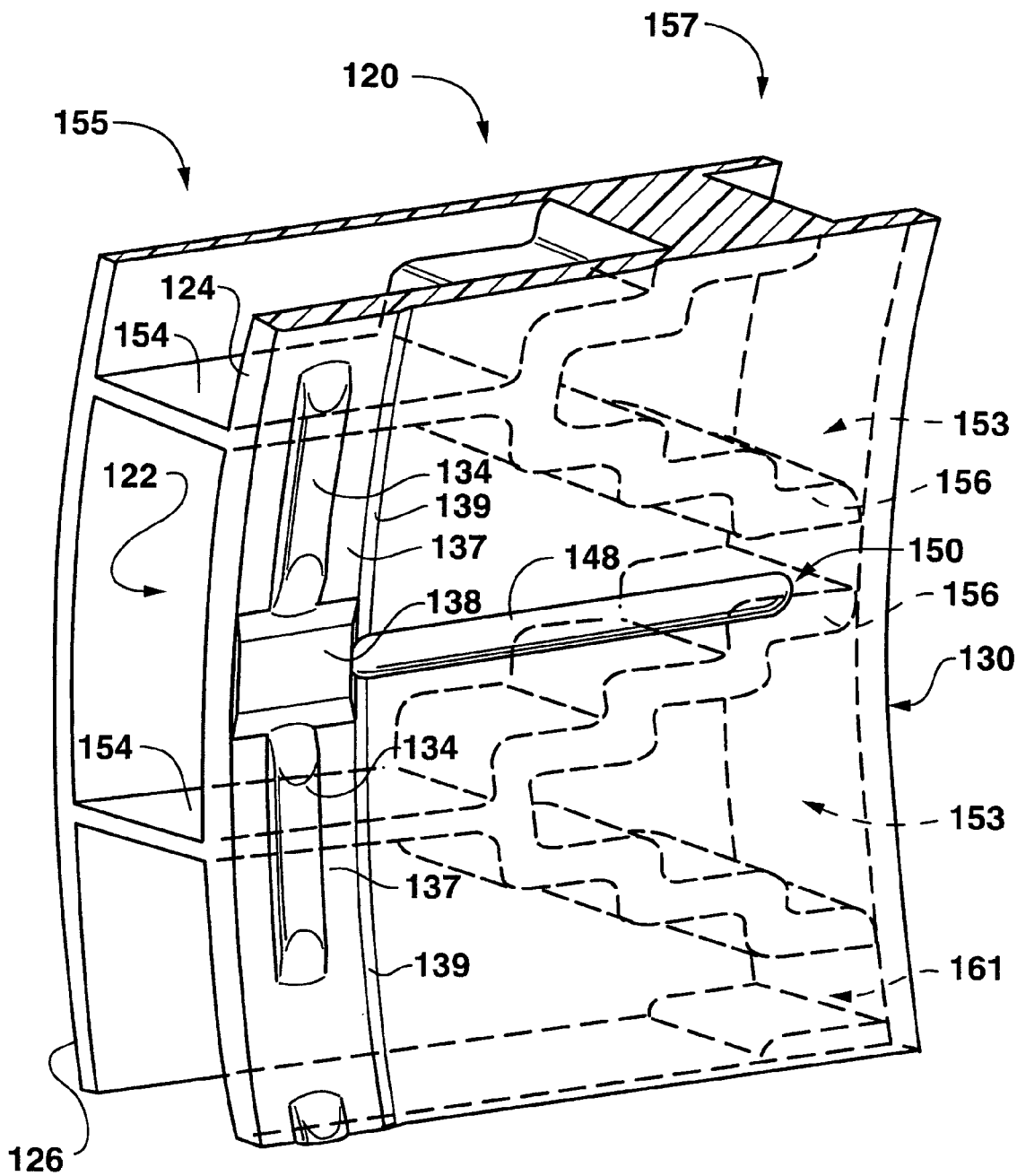
FIG. 5 is a perspective and close-up view of a section of the exemplary embodiment illustrated in FIG. 4.

Additionally, using the teachings disclosed herein, one skilled in the art will appreciate numerous other variations and alternative embodiments that fall within the spirit of the invention and scope of the claims set forth below. By way of example only, one such alternative embodiment of the present invention is depicted in FIGS. 4 and 5. A run-flat support 120 is provided having a substantially cylindrically-shaped body 122, a substantially cylindrical base 124, and a substantially cylindrical cap 126. As with previously discussed embodiments, support 120 is provided with a plurality of clips or protuberances 134 that are spaced circumferentially along radially inner-most surface 130. Protuberances 134 also fit into a recess on a rim of a run-flat support system to provide resistance against axial displacement of support 120 from a rim.

Unlike previously discussed exemplary embodiments, support 120 does not include a tab 138 between each of the protuberances 134. Instead, eight tabs 138 are equally spaced about radially inner-most surface 130 of support 120. Each tab 138 includes a sloped inboard edge 146 to facilitate the mounting of support 120 upon a tire rim as previously described. Additionally, a plurality of ribs 148 are also provided at positions axially adjacent to teach tab 138 and are longitudinally oriented along the axial direction of support 120. Each rib 148 has an inboard edge 150 that is curvilinear in shape to further enhance the mounting of support 120 onto a rim as also previously described.

Multiple variations of the present invention are possible wherein different numbers of tabs 138 and ribs 148 are positioned at different locations about radially inner-most surface 130. Applicant has determined that between about eight to twelve tabs are preferred for certain applications. However, the present invention is not so limited. By way of example, tabs 138 need not be equally spaced about radially inner-most surface 130 and other variations may be used. Furthermore, relative width and length of protuberances 34 and 134, tabs 38 and 138, and ribs 48 and 148 may be varied with respect to one another to provide multiple additional embodiments within the spirit and scope of the present invention. Also, it should be understood that the present invention is not limited to embodiments where the fins 54 and 154 are located radially adjacent to protuberances 34 and 134, respectively, as show in the figures. Instead, other variations where these elements are not radially adjacent are included.

Using the teachings disclosed herein, variations can be used to tune or optimize the run-flat support ring for the specific application under consideration while also providing a support ring that is more readily mounted and dismounted from the rim and still functioning to support the tread strip region during reasonable vehicle operation in period of low or zero inflation pressure. As discussed, variations in the fin design can also be undertaken to optimize the reduction of weight with sacrificing the load bearing and handling capabilities of the support ring. It should be appreciated by those skilled in the art that modifications and variations can be made to the support ring as described herein, without departing from the scope and spirit of the claims. It is intended that the invention include such modifications and variations as come within the scope of the appended claims and their equivalents.

What is claimed is:

1. A run-flat support ring for mounting inside a tire on a wheel rim; the tire having a tread strip region; the wheel rim having an inboard and outboard side, at least one annular depression and one annular raised surface, and also defining an axial direction; the run-flat support ring comprising:

a substantially cylindrical member configured for mounting around the wheel rim, said substantially cylindrical member having a radially outer-most surface for contacting the tread strip region of the tire in the event of a loss of air pressure, said substantially cylindrical member having a radially inner-most surface for securing said member to the wheel rim; and a plurality of wall members positioned circumferentially about said cylindrical member, each said wall member extending in a radial direction between said radially outer-most surface and said radially inner-most surface, each said wall member being constructed as a single wall on the outboard side that diverges in the axial direction of the wheel rim into two walls on the inboard side, and wherein the thickness of each of said two walls on the inboard side is greater than the thickness of said single wall on the outboard side.

2. A run-flat support ring as in claim 1, wherein said radially inner-most surface further comprises i) a plurality of circumferentially placed protuberances configured to engage the depression; ii) a plurality of circumferentially placed tabs configured for engaging the wheel rim proximate to the depression; and iii) a plurality of circumferentially placed ribs, extending longitudinally along the axial direction, and configured for engaging the annular raised surface.

3. A run-flat support ring as in claim 2, wherein said tabs are located at least partially between said protuberances.

4. A run-flat support ring as in claim 3, wherein said tabs are rectangular in shape.

5. A run-flat support ring as in claim 2, wherein said ribs are located axially adjacent to, and inboard of, said tabs.

6. A run-flat support ring as in claim 2, wherein said protuberances are about 1.7 mm or less in height relative to said radial inner-most surface.

7. A run-flat support ring as in claim 2, wherein said plurality of circumferentially placed ribs is comprised of about 8 to 12 said ribs, spaced circumferentially about said radially inner-most surface.

8. A run-flat support ring as in claim 2, wherein each said single wall is located on the outboard side and radially adjacent to at least one of said protuberances.

9. A run-flat support ring as in claim 8, wherein said single wall and said two walls form a substantially Y-shaped structure between said radially outer-most surface and said radially inner-most surface.

10. A run-flat support ring as in claim 2, wherein said single wall is generally about 5 mm in thickness.

11. A run-flat support ring as in claim 2, wherein each of said plurality of wall members are connected to one another along the circumferential direction of said support ring.

12. A run-flat support ring for mounting inside a tire on a wheel rim; the tire having a tread strip region; the wheel rim having an inboard and outboard side, at least one annular depression and defining an axial direction; the run-flat support ring comprising:

a substantially cylindrical member configured for mounting around the wheel rim, said substantially cylindrical member having a radially outer-most surface for contacting the tread strip region of the tire in the event of a loss of air pressure, said substantially cylindrical member having a radially inner-most surface for securing said member to the wheel rim; and a plurality of separate wall members positioned circumferentially about said cylindrical member, each said wall member extending in a radial direction between said radially outer-most surface and said radially inner-most surface, each said wall member being constructed as a single wall on the outboard side that diverges in the axial direction of the wheel rim into two walls on the inboard side, and wherein said two walls each have at least one ridge along the axial direction.

13. A run-flat support ring as in claim 12, wherein said radially inner-most surface further comprises i) a plurality of circumferentially placed protuberances configured to engage the depression; ii) a plurality of circumferentially placed tabs configured for engaging the wheel rim proximate to the depression; and iii) a plurality of circumferentially placed ribs, extending longitudinally along the axial direction, and configured for engaging the annular raised surface.

14. A run-flat support ring as in claim 13, wherein said tabs are located at least partially between said protuberances.

15. A run-flat support ring as in claim 13, wherein said ribs are located axially adjacent to, and inboard of, said tabs.

16. A run-flat support ring as in claim 13, wherein said single wall is generally about 5 mm in thickness.

17. A run-flat support ring as in claim 13, wherein said single wall has a thickness that is configured to retard distortion of the support ring from centrifugal forces during normal operation of the tire while also minimizing the addition of weight to the support ring from said single wall.

18. A run-flat support ring as in claim 13, wherein the axial width of said two walls is less than the axial width of the support ring and is configured for reducing the weight of the support ring while still providing adequate support for the tire during run-flat operation.

19. A run-flat support ring as in claim 12, wherein said single wall is generally about 5 mm in thickness.

20. A run-flat support ring as in claim 12, wherein said single wall has a thickness that is configured to retard distortion of the support ring from centrifugal forces during normal operation of the tire while also minimizing the addition of weight to the support ring from said single wall.

21. A run-flat support ring as in claim 12, wherein the axial width of said two walls is less than the axial width of the support ring and is configured for reducing the weight of the support ring while still providing adequate support for the tire during run-flat operation.

* * * * *